United States Patent [19]
Hermann

[11] Patent Number: 4,785,663
[45] Date of Patent: Nov. 22, 1988

[54] LEVEL CONTROL INSTRUMENT

[76] Inventor: Eberhard F. Hermann, Sonnenweg 3, D7888 Rheinfelden-Eichsel, Fed. Rep. of Germany

[21] Appl. No.: 57,548

[22] Filed: Jun. 3, 1987

[30] Foreign Application Priority Data

Jun. 11, 1986 [DE] Fed. Rep. of Germany ....... 3619678

[51] Int. Cl.$^4$ ............................................. G01F 23/28
[52] U.S. Cl. .................................... 73/290 V; 340/621
[58] Field of Search ......................... 73/290 V, 290 R; 340/612, 621, 617, 618; 310/321, 323, 351; 141/95, 198; 361/170, 178

[56] References Cited

U.S. PATENT DOCUMENTS

| | | | |
|---|---|---|---|
| 3,585,457 | 6/1971 | Zaander | 73/290 V |
| 4,325,416 | 4/1982 | Hermann | 73/290 V |
| 4,540,981 | 9/1985 | Lapetina et al. | 310/321 |

FOREIGN PATENT DOCUMENTS

| | | | |
|---|---|---|---|
| 2444931 | 8/1980 | France | 73/290 V |
| 34553 | 3/1978 | Japan | 73/290 V |
| 37782 | 3/1979 | Japan | 73/290 V |

*Primary Examiner*—William A. Cuchlinski, Jr.
*Assistant Examiner*—Patrick R. Scanlon
*Attorney, Agent, or Firm*—Quarles & Brady

[57] ABSTRACT

A level control instrument for controlling and/or indicating the filling level for liquid, powder, granular, especially light-weight bulk material in a container. The level is determined by a single rod shaped vibrator that is actuated by a vibration exciting and measuring system. The vibrator is a rod adapted to act as a bending vibrator which is dampened by bulk or liquid material. The dampening is controlled by the vibration exciting and measuring system. In order to prevent the vibrating energy from being transmitted to the container wall, the vibrating rod has two supports spaced from each other with each located at a nodal point on the rod. One free end of the rod extends into the material containing space of the container. If the two supports are at or near to the points where the vibration nodes appear when the rod is excited to bending vibration it is practically impossible for the vibration energy to be transferred to the container wall. As a result, this instrument has a high measuring sensitivity and is extremely accurate, particularly when operating on light-weight bulk materials.

13 Claims, 1 Drawing Sheet

LEVEL CONTROL INSTRUMENT

This invention relates to an apparatus for controlling and/or indicating the filling level in a container for liquid, powdered, granular, especially light-weight filling materials, consisting of a vibrating rod and of a vibration exciting system by which the vibrator is excited to vibrate, and of a vibration measuring system.

BACKGROUND OF THE INVENTION

The prior art discloses a rotary vibrating rod which is supported in the center of a membrane. A portion of the rod extends into the container and is dampened by the filling material. The increasing current of the electromagnetic vibration system caused by the dampening can be measured to determine the level of the material. This construction is simple and sturdy. It has, however, the disadvantage that when it vibrates, alternating torques act on the container well via the elastic deformed membranes so that vibrating energy is lost. For this reason the vibration exciting system must be designed accordingly powerful. The apparatus, therefore, does not react on weak dampening by light-weight filling material. As a result it can be applied only for very heavy filling material and there also only under limited conditions.

In order to increase the sensitivity of the instrument, two vibrators were provided instead of one. The phases of the two vibrators are adjusted to each other in a manner that the forces which appear on vibrating compensate each other so that the whole system loses no vibration energy to the container wall.

The prior art also includes a "tuning fork" system wherein two bending vibrators extend parallelly into the container and are excited to bending vibrations in the opposite directions. The alternating torques of the single rods compensate each other. The center of gravity of the system also is located so that the system loses almost no vibrating energy to the container wall and, therefore, has a high sensitivity for light-weight bulk material. The disadvantage of this system is that the material in the container can be jammed between the two vibrating rods which may lead to an erroneous indication. Moreover, the filling materials may build bridges between the two vibrating rods so that they cannot start to vibrate anew when the container is empty.

The prior art also provides vibrating systems where two vibrating elements are used which are concentrically arranged, the outer vibrating element working as a rotary vibrator whereas the inner vibrator element may work as rotary vibrator or a bending vibrator. The two vibrator elements vibrate in opposite directions whereby the alternating torques compensate each other.

Such instruments lose almost no energy to the container wall and have, like the tuning fork system, a high sensitivity also for extreme light-weight filling materials. In contrast to the tuning fork system, only one vibrating element extends into the container so that the problem that bulk goods are jammed between the vibrating rods, and that filling material builds a bridge, does not occur. Nevertheless, these systems, too, in principle consist of two vibrators that function to compensate each other by means of mechanical tension bridges. The precondition of an exact compensation is, therefore, a careful tuning of both single vibrators. This requires comparatively high manufacturing costs.

Moreover, there is the disadvantage that the correct function of the instrument can be disturbed by maladjustment caused e.g. by mechanical deformations.

Therefore, it is an object of the present invention to provide a level control instrument comprising a single vibrator system that resists to maladjustment by rough use and which is simple and economical to manufacture, and which reacts at least as sensitively as the known constructions. Moreover, the vibrating rod extending into the container remains accurate even after mechanical deformation.

BRIEF SUMMARY OF THE INVENTION

According to the present invention, the improved level control instrument comprises a bending vibrator rod which has two supports at a specific distance from the free ends of the rod. This construction having a single element vibrator can be readily manufactured at low cost. It combines the advantages of the sturdy "old" solutions, with a vibrator having the sensitivity of modern known systems which work with two vibrators acting in opposite phase.

Limiting the instruments to one vibrating rod enables it to withstand rough usage and deformations as well as temperature stress without sacrificing accuracy and without disturbing its adjustment. The adjustment of the device according to the invention is preserved as long as the supports of the vibrating rod in the membranes do not shift. This condition is technically very simple to realize and to guard against disturbing outside influences.

According to the present invention, the vibrating rod is supported at or near two vibration nodal points when the rod is excited to vibrate. Especially in the case when the rod is excited to its first harmonic vibration mode, and it is supported at the two vibration nodes, there are practically no forces which act on the supports. Consequently, from the very beginning, there are no forces which must be compensated by auxiliary constructions and adjustments. The vibration exciting system, therefore, can also be designed as a low power unit so that it is at least as sensitive as the known systems that work on the principle of two vibrators vibrating in opposite sense.

If the two supports of the rod are flexible, preferably as membranes which are penetrated and attached to the rod, a simple and efficient structure is obtained and isolates the vibrating system from the container and serves as temperature insulation.

The membranes can also be joined with each other in a simple way by a length of tube, a cage or the like. By this means, one obtains also an efficient protection of the vibrating rod.

Contrary to the previously known techniques, the connection between the two membranes does not serve as a mechanical tension bridge for compensation of the restoring forces of two isolated vibrations, but it has essentially the function of supporting and protecting.

As a physically completely free support of the vibrating rod can be attained only approximately, the two membranes serving as supports of the vibrating rod have the same form and size as well as being of the same material, and are arranged preferably parallel to each other in the idle position. By this construction, the restoring forces of the membranes, although very small but technically not completely avoidable, are compensated by means of the joining piece of tube, cage or the like joining the membranes.

A tight connection between the housing of the vibration system and the container wall is preferably obtained so that at the outside of the tube or cage or the like joining the two membranes an annular coupling is provided to join tightly with a corresponding bore in the container wall. As a result, the length of tube or the cage are leakproof tight at least from the annular coupling up to the membrane that is within the interior space of the container. This annular coupling is provided with an outside thread for engagement with an inner thread formed in the bore of the container so that it can be easily mounted or removed.

The described level control instrument can be constructed very compactly by adding a mass mounted on the vibrating rod between the two vibration nodes, preferably being centrally mounted between the two vibration nodes. As a result, the distance between the vibration nodes is reduced and the distance between the supporting membranes is reduced in proportion to the length of the vibrating rod. This serves to increase the sensitivity of the system.

The sensitivity can be further increased by the free end of the vibrating rod extending into the container being flattened like a paddle. The flattening of the vibrating rod is in a plane that is transverse to the vibration plane of the rod and the flattened portion extends downwardly into the container.

The described device can be constructed more compactly by attaching an additional mass on the free end of the vibrating rod that is outside of the container. This enables that part of the rod to be shortened.

The vibration exciting and measuring system is mounted preferably at the free end of the vibrating rod that extends out of the container. The vibration exciting and vibration measuring systems can be according to well known constructions. A very simple but efficient arrangement is obtained by using well known piezoelectric elements attached on the vibrating rod. The rod is flattened where the vibration exciting and/or vibration measuring systems are mounted. The piezoceramic discs or the like are then attached on the flat surfaces side by side or on opposite sides of the rod. This position of the piezoelectric vibration exciting and vibration measuring systems has the advantage that the piezoceramic discs are protected better from heat influence due to radiation as well as due to heat conduction from hot material in the container. In previously known techniques the vibration exciting system was mounted directly behind the measuring probe which extended into the container so that the vibration exciting system was subjected to the temperature generated by the material in the container.

In order to avoid a direct mechanical vibration coupling from the vibration exciting to the vibration measuring piezoelectric element, which could cause a misfunction, the two piezoelements are axially spaced on the same side or on opposite sides of the vibrating rod. The electric connections of the two piezoelectric systems are connected in well known manner to the input and the output respectively of an amplifier to form a feedback vibrating system with the measuring system.

To guarantee a permanent stability and a uniform heat expansion of all parts of the vibrating rod, the supporting membranes and/or the joining tube are fabricated of metal, preferably of stainless steel in order to guarantee the corrosion resistance against chemical materials placed in the container.

BRIEF DESCRIPTION OF THE DRAWING

In the following, the invention with its essential parts is described more detailed on the basis of the drawing. It shows.

DESCRIPTION OF THE PREFERRED EMBODIMENT

Figures 1, 2:
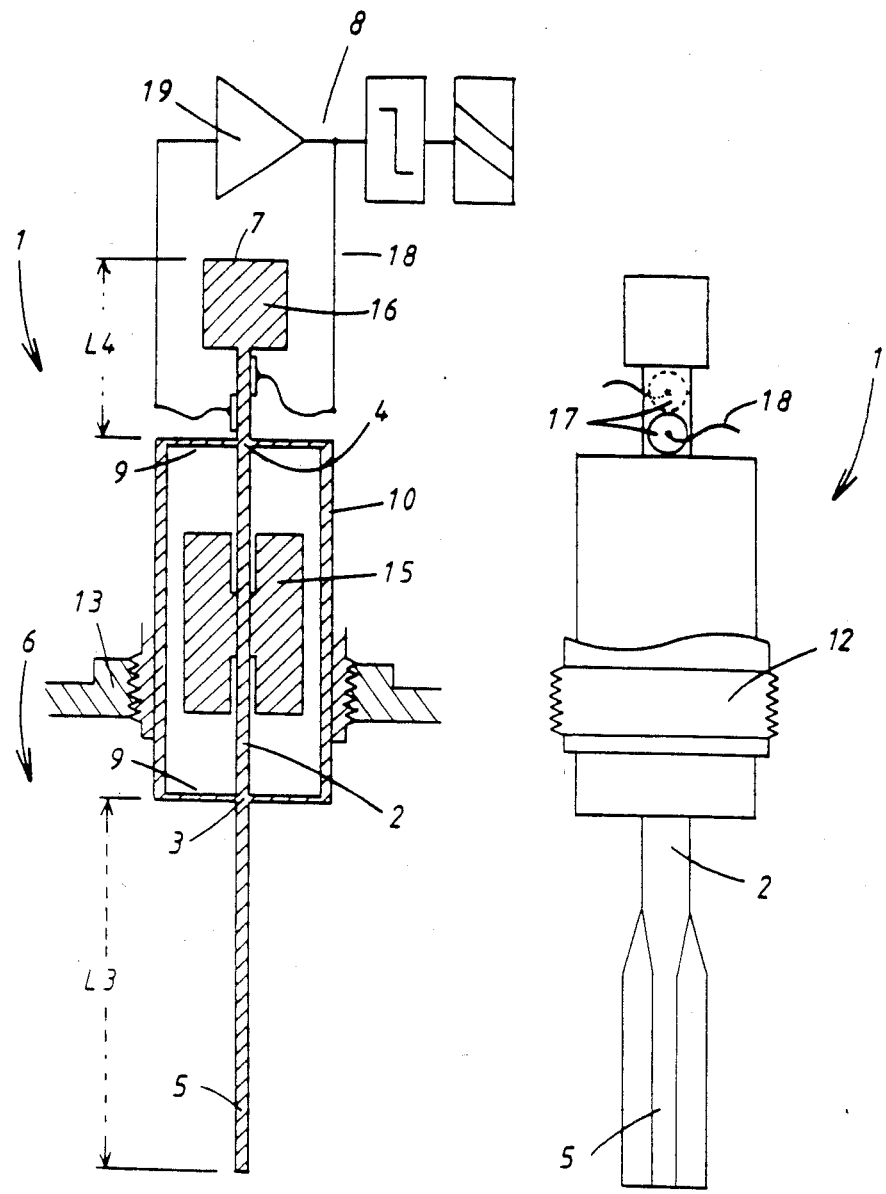
FIG. 1 is a view in front elevation showing the level control instrument of the present invention.
FIG. 2 is a longitudinal cross sectional view through the level control instrument illustrated in FIG. 1.

The level control instrument generally identified by the reference numeral 1 comprises a rod (2) configured as a bending vibrator secured to the two supports 3 and 4 which are formed of membranes 9. The support 3 is located a distance L3 from the free end 5 of the rod 2 that extends into the container space 6 for the filling material. The support 4 on the other hand is located a distance L4 from the opposite free end 7 of the rod 2. Rod 2 is excited to vibrate in well known manner by a piezoelectric feedback vibration exciting system 8.

In order to enable the rod to vibrate as freely as possible, without transmitting forces to the container wall 13 through the supports 3 and 4, the distances L3 and L4 are dimensioned so that supports 3 and 4 coincide with the vibration nodes of the first harmonic bending vibrations of the rod.

As a result of this simple arrangement, the whole restoring force of the vibrating rod near the supporting points 3 and 4 is practically absorbed by the rod tension itself. The membranes 9, that form the supports 3 and 4 are not subjected to essential restoring forces resulting from the vibration.

The described supports result in the center of gravity of the rod remaining in the same position during the vibration and therefore no tensile or compressing forces act on the membranes 9 in vertical direction. In this manner the supports 3 and 4 isolate the vibrating rod from the material container 13 so that the vibration energy cannot be transmitted from the vibrating rod 2 to the container 13.

In order to compensate for the torques acting on the membranes and appearing in the vibration plane, the two membranes 9 of supports 3 and 4 of the vibrating rod are of identical configuration, size and material, and when at rest, they are parallel to each other. As a result of this arrangement, the remaining restoring forces of the two membranes 9 compensate each other by means of the tube 10 which acts as a mechanical tension bridge. As shown, the lower end of the tube 10 extends into the space 6 of the container and is mounted to the container by means of an annular threaded coupling 12 for a tight connection with a suitable threaded bore in the wall 13 of the container.

The free end 5 of the vibrating rod which extends into the space 6 is formed into the shape of a paddle. The plane of the paddle is perpendicular to the plane of the vibration of rod 2 and the rod 2 is vertically oriented in the container so that no particles of filling material can remain lying on the paddle surface which would dampen the vibration even if the filling level would drop under the measuring level.

In order to compactly construct the level control instrument, an additional mass 15 is centrally secured to the rod 2 between the two membranes 9. The mass 15 serves to reduce the distance between the vibration nodes which, according to this invention, is also the distance between the membranes 9. The length of the free end of the vibration rod extending beyond the support 4 is reduced by means of an additional mass 16 attached to its end.

Two piezoelectric elements 17 of a known feedback vibration exciting and vibration measuring system 8 are mounted on the rod 2 between the mass 16 and the support 4. The area of the vibrating rod 2 where the piezoelectric elements 17 are attached is flattened and the piezoelectric elements 17 are axially spaced and mounted on opposite sides of this flat portion of the rod. The piezoelectric elements 17 are connected by cables 18 with the input and output of an amplifier 19 to complete the feedback vibration system. The appreciable distance of the piezoelectric elements 17 from the interior of the container makes it possible to use the instrument with very hot filling material without affecting the elements.

To achieve the necessary stability and corrosion resistance as well as to obtain a uniform heat expansion, the vibrating rod 2, the supporting membranes 9 and their joining tube 10 are fabricated in the illustrated embodiment of stainless steel.

From the foregoing detailed description of the illustrative embodiment set forth herein to exemplify the present invention, it will be apparent that there has been provided an improved level control instrument which is especially adapted to isolate the vibrating rod in the container from the container wall. As a result, improved accuracy is obtained and the instrument is particularly well adapted for use with light-weight filling materials.

Although the illustrative embodiment of the invention has been described in considerable detail for the purpose of disclosing a practical operative structure whereby the invention may be practiced advantageously, it is to be understood that the particular apparatus described is intended to be illustrative only and that the novel characteristics of the invention may be incorporated in other structural forms without departing from the spirit and scope of the invention as defined in the subjoined claims.

I claim:

1. An apparatus for indicating the level of a material in a container having a space for receiving the material comprising, a rod having two free ends supported so that one free end extends into the space in said container and its opposite free end extends outside of the container, means connected to vibrate said rod in a bending vibration, and means connected to measure the vibration of said rod, the improvement comprising a pair of spaced supports secured to said rod to support said rod in the container with each support being located a predetermined distance from the free ends of said rod and, each of said supports being located at a natural nodal point of vibration along the length of the rod.

2. An apparatus according to claim 1 wherein said nodal points are those that appear when the rod is excited in its first harmonic vibration mode.

3. An apparatus according to claim 1 wherein said two supports of the rod are flexible and are configured as membranes which are penetrated by the rod and joined with it.

4. An apparatus according to claim 3 including a cylindrical member adapted to receive said rod extending through it along its longitudinal axis, and said membranes are secured to a cross section of said member in spaced relationship.

5. An apparatus according to claim 3 wherein the two membranes supporting the vibrating rod have the same form and size as well as the same material and are mounted parallel to each other.

6. An apparatus according to claim 4 including an annular coupling mounted on the outer diameter of said cylindrical means, said coupling being provided with a male thread for threaded connection with a complementary threaded bore in the container, said threaded connection being impermeably tight to prevent any leakage therethrough.

7. An apparatus according to claim 1 including an additional mass (15) secured to said vibrating rod between said two nodal points for reducing the distance between the nodal points.

8. An apparatus according to claim 1 including an additional mass secured to the free end of the vibrating rod that extends outside of the container to enable the rod to be shortened.

9. An apparatus according to claim 1 wherein said means to vibrate said rod and the means to measure the vibration of said rod are mounted at the free end of the vibrating rod that extends outside of the container.

10. An apparatus according to claim 1 wherein said means to vibrate said rod and the means to measure the vibration of said rod include piezoelectric elements mounted at the free end of the vibrating rod that extends out of the container.

11. An apparatus according to claim 10 including a flattened portion formed on the vibrating rod for receiving the piezoelectric elements that are axially spaced on said flattened portion.

12. An apparatus according to claim 11 including an amplifier that is electrically connected to the piezoelectric elements to a feedback vibrating system.

13. An apparatus according to claim 1 wherein the end of the vibrating rod extending into the space of the container is flattened so that it is shaped like a paddle to increase the sensitivity of the apparatus.

* * * * *